United States Patent [19]

McLane

[11] Patent Number: 4,631,909
[45] Date of Patent: Dec. 30, 1986

[54] LAWN MOWER VACUUM APPARATUS

[76] Inventor: Frank E. McLane, 309 Regatta Way, Seal Beach, Calif. 90740

[21] Appl. No.: 758,093

[22] Filed: Jul. 23, 1985

[51] Int. Cl.$^4$ ............................................. A01D 35/22
[52] U.S. Cl. ....................................... 56/202; 56/16.6; 56/320.2
[58] Field of Search ...................... 56/202, 320.2, 17.5, 56/16.6

[56] References Cited

U.S. PATENT DOCUMENTS

| | | | |
|---|---|---|---|
| 2,807,126 | 9/1957 | Bennett | 56/25.4 |
| 2,955,402 | 10/1960 | Strasel | 56/25.4 |
| 2,955,404 | 10/1960 | Strasel et al. | 56/202 |
| 2,990,666 | 7/1961 | Blume | 56/25.4 |
| 3,006,128 | 10/1961 | Weiland | 56/194 |
| 3,143,842 | 8/1964 | Mattson et al. | 56/202 |
| 3,367,091 | 2/1968 | Weiland | 56/25.4 |
| 3,708,968 | 1/1973 | Enters et al. | 56/16.5 |
| 3,757,503 | 9/1973 | Soldavini | 56/202 |
| 3,822,536 | 7/1974 | Leader | 56/202 |
| 3,971,198 | 7/1976 | Lane | 56/202 |
| 3,987,606 | 10/1976 | Evans | 56/13.4 |
| 4,037,394 | 7/1977 | Lindblad | 56/202 |
| 4,095,398 | 6/1978 | Aumann et al. | 56/202 |
| 4,250,698 | 2/1981 | Pappalardo et al. | 56/202 |
| 4,310,998 | 1/1982 | Cuba | 56/202 |
| 4,399,647 | 8/1983 | Soldavini | 56/202 |
| 4,413,467 | 11/1983 | Arizpe | 56/11.3 |
| 4,505,095 | 3/1985 | Short | 56/202 |
| 4,512,144 | 5/1985 | Soldavini | 56/202 |

Primary Examiner—Gene Mancene
Assistant Examiner—John G. Weiss
Attorney, Agent, or Firm—Knobbe, Martens, Olson & Bear

[57] ABSTRACT

A closed-loop lawn mower vacuum apparatus which utilizes the centrifugal forces created by a rotating grass cutting blade to impel grass clippings and other solid debris through an exhaust chute to be automatically deposited in a fully enclosed, rigid, one-piece grass catcher. The grass clippings and other solid debris are entrained in a flow of air which is forced into the grass catcher. The air within the grass catcher is returned beneath the mower through a return chute, and recirculated through the closed loop system to remove any debris still entrained in the air flow. The inlet port of the return chute and the grass catcher are shaped so that solids will automatically be removed from the air flow within the grass catcher. Also, the discharge port of the return chute, located beneath the lawn mower deck, is partially enclosed by a shroud which directs the flow of solids out of the grass catcher so as to be recirculated through the system, and not left uncollected on the lawn surface.

18 Claims, 7 Drawing Figures

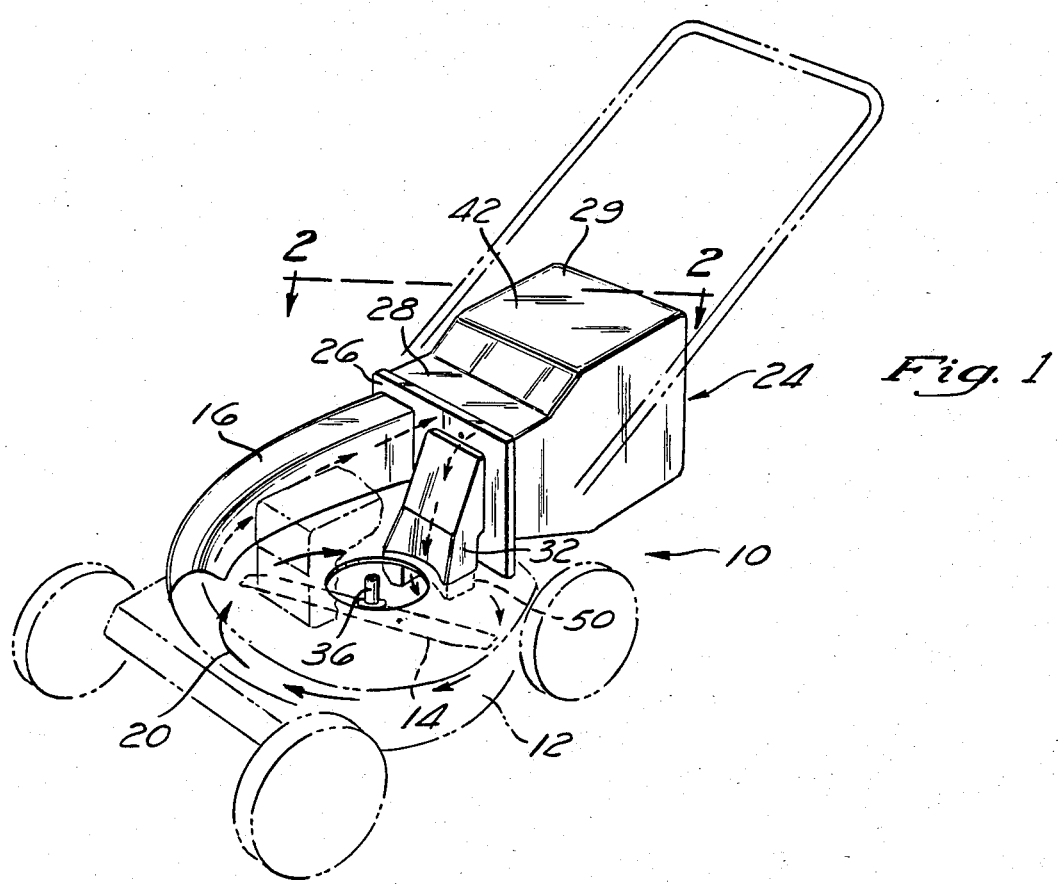
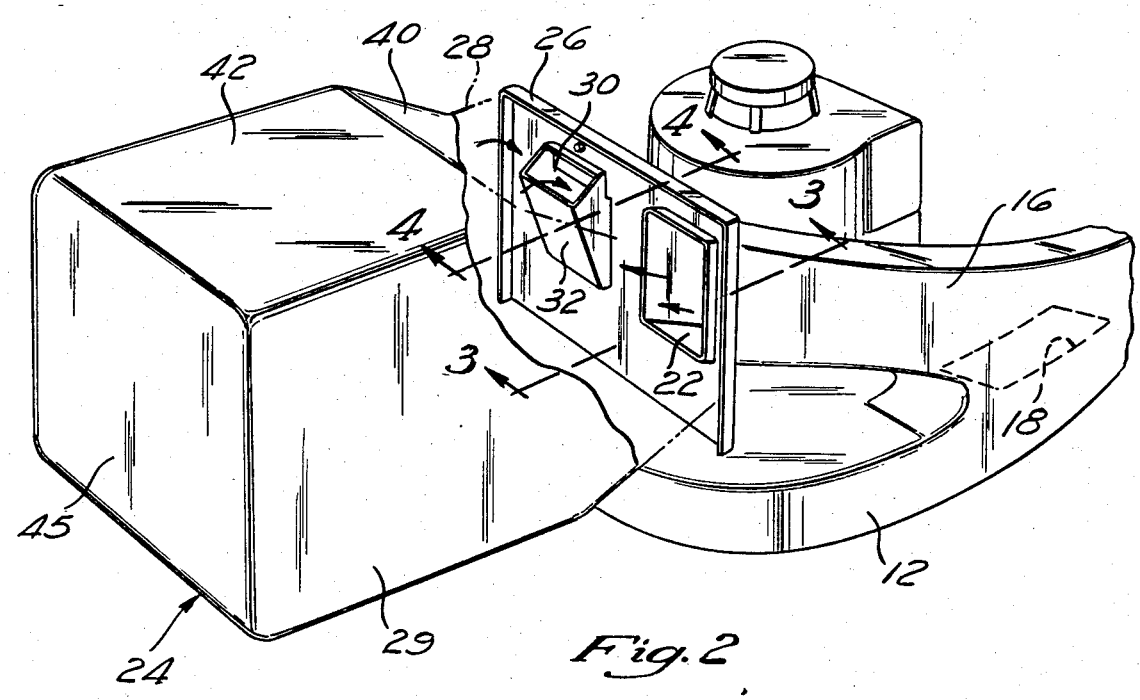

LAWN MOWER VACUUM APPARATUS

BACKGROUND OF THE INVENTION

The present invention relates generally to lawn mowers, and more particularly to a vacuum device which automatically draws grass clippings and other solid debris into a grass catcher.

Previous lawn mowers have utilized the vacuum effect created by a rotating grass cutting blade to collect grass clippings and other solid debris within a grass catcher, thus obviating the need to rake. The rotating blade will act as an impeller to force air and solid debris into a grass catcher. Generally, the grass catcher must have rearwardly positioned vents or mesh which retain solids such as grass clippings, twigs, and leaves within the grass catcher but allows the flow of air in which the solids are entrained to pass through the grass catcher.

A problem associated with this type of system is that dust particles are capable of filtering through the mesh, thus creating a dust cloud behind the mower which is unpleasant for the operator of the mower, and which may be harmful to the mower's engine.

To alleviate this problem, a closed loop vacuum system was developed by Enters, et al. (U.S. Pat. No. 3,708,968) in which air and associated dust entering the grass catcher is returned to the mower blade through another chute, and thereby recirculated, as opposed to being discharged into the atmosphere. However, the system disclosed by Enters is complex and requires a multi-part grass catcher, inlcuding a rotating fan blade used to separate the air flow generated by the mower blade from the solids sought to be deposited within the grass catcher.

Thus, a need exists for a closed looped lawn mower vacuum system which automatically separates solids entrained in the air flow passing through the grass catcher, without discharging the air flow to the atmosphere.

SUMMARY OF THE INVENTION

Briefly, the present invention is a vacuum apparatus for a lawn mower which has a rotating blade and a deck that encloses the blade. The vacuum apparatus includes a rigid, preferably one piece grass catcher that is removably secured to the lawn mower. The grass catcher has an opening at its front end through which it is filled and emptied. An exhaust chute extends from the lawn mower deck to the grass catcher to feed grass clippings and other solid debris into the grass catcher. The inlet to the exhaust chute passes through the lawn mower deck, and the exhaust chute has a discharge port at the open front end of the grass catcher. The exhaust chute inlet port is located near the perimeter of the blade's circular cutting path so that grass clippings and other debris are driven through the exhaust chute and into the grass catcher by the centrifugal forces created by the rotation of the blade.

The vacuum apparatus further includes a return chute which has an inlet port located at the open front end of the grass catcher and a discharge port beneath the deck. The return chute discharge port is located in the low pressure area near the rotational center of the blade so that air and any solids not retained in the grass catcher can be drawn through the return chute and recirculated back into the grass catcher. The system thus forms a closed loop in which all solids entrained in the air flow are either automatically separated from the air and deposited in the grass catcher, or recirculated through the system. No air is vented to the atmosphere through the grass catcher, so that no dust escapes the grass catcher.

Preferably, the grass catcher includes a neck portion which terminates in the open front end, and a container portion which has a larger cross-sectional area than the neck portion. The container portion forms a rear cavity in which the majority of grass clippings and other solid debris are deposited. The neck portion and container portion are connected by a tapered portion, the walls of which deflect the solids entrained in the flow of air through the grass catcher, so that the solids remain within the grass catcher and do not flow through the return chute with the air. To enhance separation of the solids from the air flow within the grass catcher, the top wall of the tapered portion slopes downwardly towards the open front end of the grass catcher, and the bottom wall of the tapered portion slopes upwardly towards the grass catcher front end so that grass clippings will slide into the container portion.

The exhaust chute discharge port and the return chute inlet port are positioned adjacent each other on a substantially vertical cowling extending upwardly from the lawn mower. The front end of the grass catcher sealingly abuts the cowling to fully close the opening in the grass catcher. The return chute inlet port is positioned near the top wall of the grass catcher, so that solids will have already precipitated out of the air flow entering the return chute.

In a preferred embodiment, the return chute discharge port includes a shroud protruding beneath the lawn mower deck. The shroud has a radially outer wall, relative to the rotational center of the blade, which directs the flow out of the return chute toward the center of the blade. Further, the shroud is elongated along an axis tangential to the blade's circular rotational path, and includes a partially enclosed trailing end shield which directs flow tangentially to the circular blade path, and in the direction of the blade's rotation. The channeling of the flow from the return chute by the shroud helps to retain solids beneath the deck so that they may be recirculated through the exhaust chute, and not discharged to the atmosphere or left on the lawn surface.

BRIEF DESCRIPTION OF THE DRAWINGS

FIG. 1 is a partially cut away perspective view of a lawn mower, shown in broken lines, which includes the present vacuum apparatus.

FIG. 2 is a partially cut away rear perspective view of the lawn mower in FIG. 1, as viewed from Line 2—2.

DETAILED DESCRIPTION OF THE PREFERRED EMBODIMENT

Figure 3:
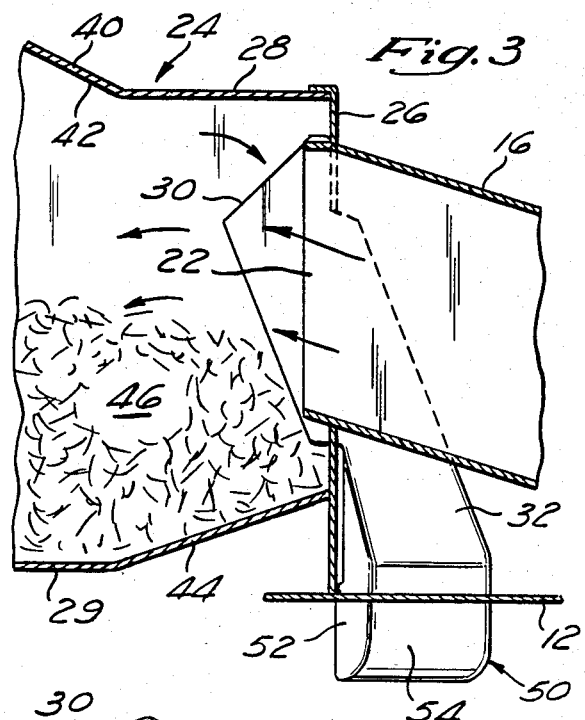
FIG. 3 is a cross-sectional view of the mower in FIG. 2 taken along Line 3—3.

A preferred embodiment of the present vacuum apparatus of the present invention is shown in FIG. 1. As illustrated, the apparatus is mounted on a rotary lawn mower 10 (shown in broken lines). The mower 10 includes a blade housing or deck 12 which covers and surrounds a rotating grass cutting blade 14 beneath the deck 12. As is best shown in FIGS. 1 and 2, an elongate, tubular exhaust chute 16 extends generally upwardly and rearwardly from the deck 12. In the embodiment shown the chute 16 is curved to generally follow the periphery of the deck 12. The exhaust chute 16 includes an inlet port 18 disposed at a corresponding opening in the deck 12, through which grass clippings and other debris beneath the deck 12 enter the exhaust chute 16. The exhaust chute inlet port 18 is located along the outer periphery of the circular rotational path 20 of the cutting blade 14, at which point the centrifugal forces and air pressure created by the rotating blade 14 are at their greatest. Grass clippings and other debris beneath the deck 12 become entrained in a flow of air impelled by the blade 14, and are blown into the exhaust chute 16. The exhaust chute 16 terminates at a rectangular discharge port 22, which forms an opening disposed in a generally vertical plane. The discharge port 22 directs the flow of air from the exhaust chute 16 into a fully enclosed grass catcher 24.

The exhaust chute discharge port 22 passes through and is sealed to an opening in a substantially vertical plate or cowling 26 which extends upwardly from the rear of the deck 12. The grass catcher 24 includes a neck portion 28 and a container portion 29. The catcher 24 has an opening at the neck portion 28 for receiving grass clippings from the discharge port 22. Except for this opening in the neck portion 23, the catcher 24 forms a completely sealed container. The neck portion 28 of the catcher 24 is sized such that the edges of the neck portion opening fit within a lip formed on the perimeter of the cowling 26 so that the neck portion 28 sealingly engages the cowling 26 to prevent dust or other solids from being discharged from the grass catcher 24 to the atmosphere. Thus, the grass catcher 24 and the cowling 26 cooperate to from an enclosed container which is open only to the two ports 22, 30.

Figure 4:
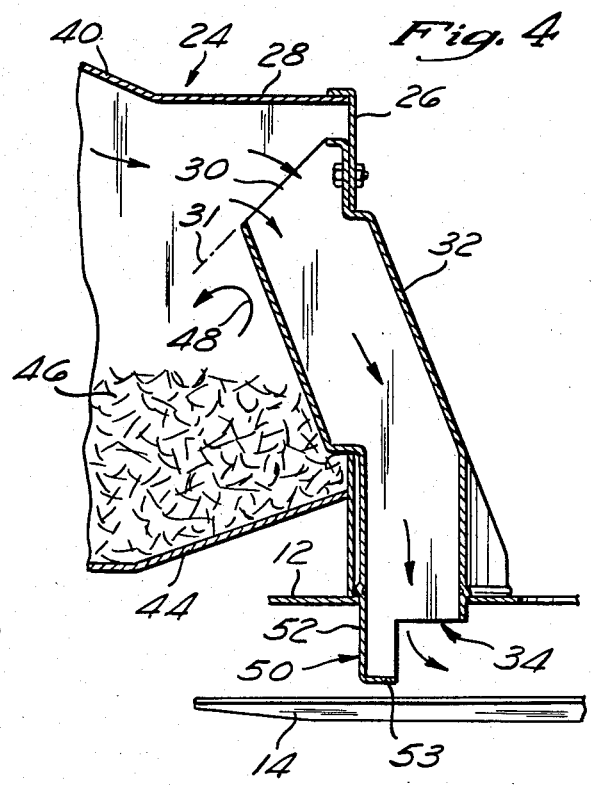
FIG. 4 is a cross-sectional view of the mower in FIG. 2 taken along Line 4—4.
Figure 5:
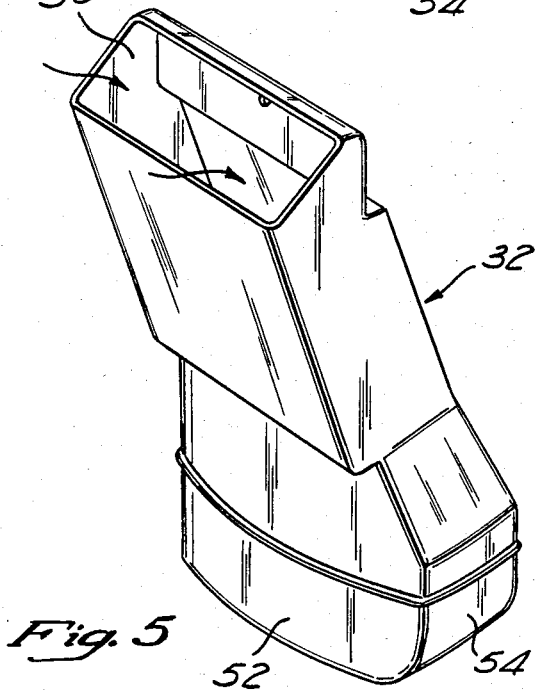
FIG. 5 is a rear perspective view of a return chute.
Figure 6:
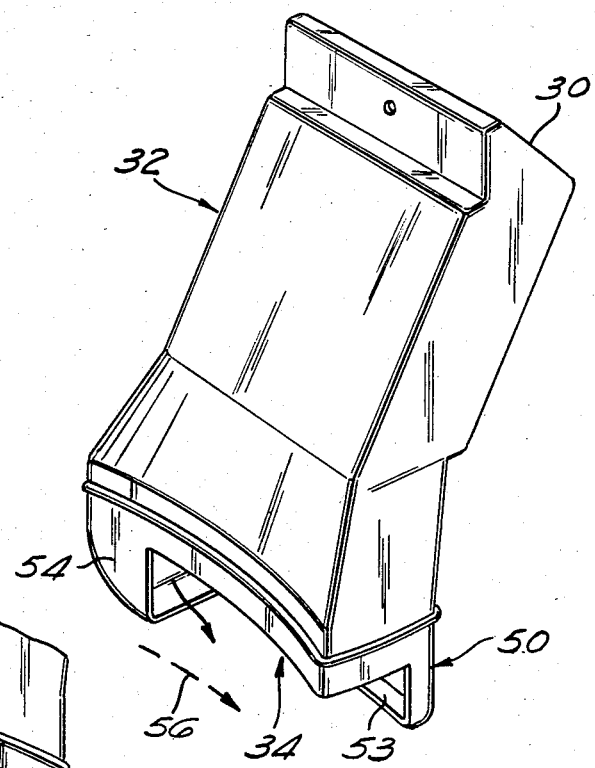
FIG. 6 is a front perspective view of the return chute of FIG. 5.
Figure 7:
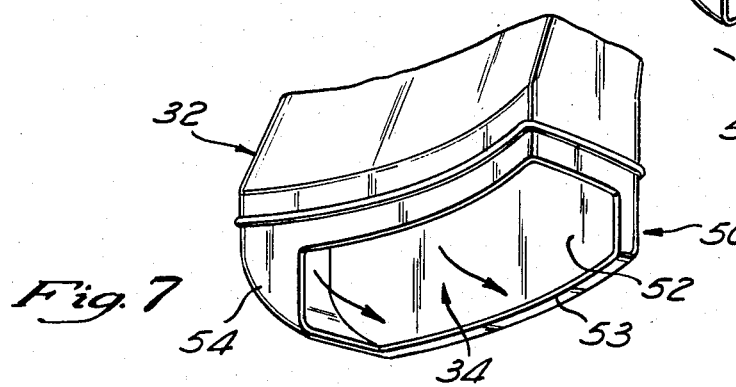
FIG. 7 is a partial perspective view of the discharge port and shroud at the bottom of the return chute of FIGS. 5 and 6.

Adjacent the exhaust chute discharge port 22 is an elongate tubular return chute 32. as is best shown in FIG. 4, the return chute 32 is disposed in a generally vertical orientation, and extends from an inlet port 30 inside the grass catcher 24 towards the cowling 26, and then passes through and is sealed to an opening in the cowling 26. The return chute 32 then passes through and is sealed to an opening in the deck 12 such that the chute 32 terminates beneath the deck 12 at a return chute discharge port 34. The return chute discharge port 34 is positioned closer to an axis of rotation 36 of the blade 14 than is the exhaust chute inlet port 22. Since the centrifugal forces and pressure created by the blade 14 increase with distance from the axis of rotation 36, the pressure at the return chute discharge port 34 is lower than at the exhaust chute inlet 18. The pressure at the exhaust chute inlet 18 is substantially the same as that within the grass catcher 24. This pressure differential causes air to be drawn from the grass catcher 24 and through the return chute 32. The rotation of the blade 14 causes air and any remaining solids flowing through the return chute 32 to be recirculated through the exhaust chute 16 and back into the grass catcher 24, as discussed below. Thus, the exhaust chute 16, the grass catcher 24, and the return chute 32 form a fully enclosed, sealed passageway between the inlet port 18 and the discharge port 34 to prevent discharge of debris or air flow to the atmosphere.

The exhaust port 22 and inlet port 30 are positioned to cooperate with the shape of the grass catcher 24 so that solids are automatically deposited therein, and do not remain entrained in the air flow which enters the return chute inlet 30. The grass catcher 24 is preferably a one-piece enclosure formed entirely of a rigid, material, such as plastic. The internal profile of the grass catcher 24 is defined by the walls of the grass catcher 24, and there are no internal projections from the grass catcher walls. The container portion 29, which is at the rear end of the grass catcher 24, forms a large, enclosed cavity in which the majority of clippings and other solids are retained. Adjacent the container portion 29 of the grass catcher 24 is a tapered portion 40, which connects the container portion 29 with the neck portion 28. The top wall 42 of the grass catcher 24 is downwardly sloped along the tapered portion 40. Likewise, the bottom wall 44 of the grass catcher 24 is upwardly sloped along the tapered portion 40 and the neck portion 28.

The cross-sectional area of the neck portion 28 is smaller than that of the container portion 29. The sloped bottom wall 44 allows grass clippings 46 to slide down rearwardly into the rear cavity formed by the container portion 29, thus leaving the exhaust chute discharge port 22 at the front of the grass catcher unobstructed, as best shown in FIGS. 3 and 4. In operation, the discharge port 22 directs the flow of air and debris along a path parallel to the bottom wall 44 and towards the rear wall 45 of the catcher 24. After the flow impacts against the rear wall 45, it reverses direction such that the flow is directed towards the inlet port 30 at the cowling 26. The sloped top wall 42 of the grass catcher 24 deflects solids entrained in the air flow within the grass catcher 24 as the air flow is funneled through the nozzle portion 28 and enters the return chute inlet port 30, causing the solids to precipitate out of the air flow and remain with the grass chatcher 24.

The exhaust chute 16 and discharge port 22 are oriented to direct the air flow toward the center of the catcher 24, so that grass clippings entering the grass catcher 24 are distributed evenly throughout the vertical height of the grass catcher 24. The return chute inlet port 30 is positioned proximate the grass catcher top wall 42. Due to gravity, solids entrained in the flow of air through the grass catcher 24 will tend to precipitate downwardly. Fewer solids are present in the air near the top wall 42 of the grass catcher, and since the return chute inlet port 30 is near the top wall 42, most solids will be retained within the grass catcher 24 as opposed to entering the return chute 32.

The inlet port 30 is preferably rectangular in shape, with the longer sides of the rectangle being parallel to the top wall 42 of the grass catcher 24 so that the majority of the opening defined by the inlet port 30 is proximate to the top wall 42. the opening formed by the inlet port 30 lies in a plane 31 which is preferably angled from the vertical such that it slopes downwardly into the grass catcher 24 at an angle of approximately 45° from the vertical.

The cross sectional area of the flow path defined by the return chute 32 at its narrowest point is smaller than that of the exhaust chute 16 at its narrowest point, the inlet port 22. Preferably, the minimum cross-sectional area of each chute differs by about 10%–15%. As a result, the air flow out of the grass catcher 24 through the return chute 32 is constricted relative to the high pressure flow into the grass catcher 24 through the exhaust chute 16, causing the air pressure within the grass catcher 24 to increase. Due to the rigid construction of the grass catcher 24, it is able to withstand this internal pressurization. One benefit of the air pressure within the grass catcher 24 is that since the exhaust chute discharge port 22, which is the source of the pressure, is located at the front end of the catcher 24, solid debris will be constantly forced from the front to the rear of the catcher 24, and into the container portion 29. This reduces the amount of debris which will enter the return chute 32.

The pressurization of the grass catcher 24 also enahnces the pressure differential between the return chute discharge port 34 and the exhaust chute inlet port 18 so that any debris exiting the grass catcher 24 will be recirculated, and not left on the lawn surface. In particular, the high pressure air within the air catcher that flows through the return chute 32 expands rapidly and decreases in pressure as the flow passes out of the constricting return chute 32, and in effect is "throttled". The high pressure region at the periphery of the deck 12, discussed above, isolates debris exiting the discharge port 34 to the area immediately surrounding the center of rotation 36 of the blade 14, so that the debris does not escape from under the deck 12. The impeller action of the blade 14 then pumps the debris and air back through the exhaust chute inlet 18 to be recirculated.

To further retain solids within the grass catcher, the tubular return chute 32 is disposed at an angle relative to the cowling 26 such that the walls of the chute 32 slope downwardly from the inlet 30 toward the cowling 26. As is best shown in FIG. 4, the angled orientation of the return chute 32 within the grass catcher 24 prevents solids resting on the bottom wall 44 of the grass catcher 24 from flowing upwardly and into the return chute inlet 30. As indicated by arrow 48 in FIG. 4, the flow path of solids in motion beneath the return chute inlet port 30 is diverted away from the return chute inlet port 30 by the sloped walls of the return chute 32.

Any solids which pass through the return chute 32 and are discharged beneath the deck 12 will be recirculated into the exhaust chute 16 so that the mower 10 is not trailed by a dust cloud, and so that the lawn surface is vacuumed clean. As discussed above, the discharge port 34 of the return chute 32 is located in a low pressure region proximate to the rotational axis 36 of the blade 14. To ensure that solids discharged from the return chute 32 are recirculated, the return chute discharge port 34 is partly enclosed by a shroud 50, as is best shown in FIGS. 4-7. The shroud 50 includes an outer wall 52 which projects downwardly from the mower deck. This wall 52 is disposed on the side of the chute 32 which is furthest from the rotational axis 36 of the blade 14. At the bottom of the wall 52, a lip 53 projects radially inwardly toward the axis 36.

The return chute discharge port 34 is elongated along an arc which generally follows the circular rotational path of the blade 14 so that the entire port 34 is proximate the rotational center 36 of the blade 14. The radially outer wall 52 directs flow out of the discharge port 34 toward the center 36 of the blade 14, where the air pressure is lowest, to prevent the impeller action of the blade 14 from forcing air back into the return chute 32.

The shroud 50 also has a trailing end shield 54 which partially enclose the trailing end of the elongate arcuate discharge port 34. As used herein, the term "trailing end" means the end of the port 34 which trails the blade 14 during rotation (i.e., the end adjacent to the tail of the arrow 56 which represents the blade's rotation direction). The shield 54 is generally shaped in the form of a chute to redirect the downward flow of air from the port 34 so that it is tangential to the direction of the rotation of the blade 14, indicated by arrow 56 in FIG. 6. The enclosed trailing end shield 54 also prevents air stirred by the blade 14 from being forced back into the return chute 32, which may cause debris exiting the return chute discharge port 34 to be scattered out from under the deck 12 and into the atmosphere.

Partly due to the shape of the shroud 50, which prevents air from being forced into the return chute 32 through the discharge port 34, a vacuum is created which draws air and airborne solids from the catcher 24, through the return chute 32, and out of the discharge port 34. Thus, the system is truly a closed loop as the air within the grass catcher 24 is constantly recirculated, and no air needs to be drawn underneath the deck 12 from the atmosphere. As a result, the deck 12 and blade 14 can be completely lowered until it contacts the ground to cut grass to a short height, as on a putting green, without sacrificing the vacuuming function of the system.

I claim:

1. A vacuum apparatus for a lawn mower, said lawn mower having a rotating blade and a deck enclosing said blade, said vacuum apparatus comprising:
   a grass catcher removably secured to said lawn mower, said grass catcher having a front end and a rear end, said front end having an opening through which it is filled and emptied, said rear end disposed further from said mower than said front end;
   an exhaust chute having an inlet port beneath said lawn mower deck and a discharge port located at said front end of said grass cather, said exhaust chute inlet port being located at a relatively high pressure region near the perimeter of the blade's circular cutting path so that grass clippings and other debris are carried through said exhaust chute and into said grass catcher by the an air flow created by the rotation of said blade, said exhaust chute discharge port oriented to direct said air flow towards the rear of said catcher to carry said clippings to said rear of said catcher;
   a return chute having an inlet port located at said front end of said grass catcher, and a discharge port located beneath said deck, said return chute discharge port being disposed in a relatively low pressure region proximate to the rotational center of said blade, said grass catcher, exhaust chute and return chute formed of materials substantially impermeable to air, said opening of said grass catcher sealed to said exhaust chute discharge port and to said return chute inlet port to form an enclosed sealed passageway between said exhaust chute inlet port and said return chute discharge port, to permit said air flow through said exhaust chute to return to said mower through said return chute for recirculation through said passageway, thereby forming a closed circulatory loop; and
   means for constricting the air flow through said return chute relative to the air flow out of said exhaust chute discharge port to cause substantial internal pressurization of said grass catcher.

2. The apparatus of claim 1, wherein said constricting means is formed by sizing the return chute and the exhaust chute such that the minimum cross-sectional area of the return chute is substantially smaller than the minimum cross-sectional area of the exhaust chute.

3. The apparatus of claim 2, wherein to minimum cross-sectional areas of the return chute and exhaust chute differ by approximately 10-15%.

4. The apparatus of claim 1, wherein said grass catcher further comprises:
   a neck portion forming said opening at said front end;
   a container portion having a larger cross sectional area than said neck portion, said container portion forming a rear cavity in which the majority of grass clippings and debris are deposited; and
   a tapered portion connecting said neck portion and said container portion.

5. The apparatus of claim 1, wherein said tapered portion includes a top wall which slopes downwardly from said container portion towards said neck portion.

6. The apparatus of claim 5, wherein said tapered portion has a bottom wall which slopes upwardly from said container portion towards said neck portion.

7. The apparatus of claim 1, wherein the opening formed by said return chute inlet port is proximate to the top wall of said grass catcher.

8. The apparatus of claim 7, wherein the opening formed by said return chute in port lies in a plane, and said plane is inclined from the vertical by about 45°.

9. The apparatus of claim 1, additionally comprising:
   a cowling, attached to the deck of said mower, for providing said sealing of the opening of said grass catcher to said exhaust chute and to said return chute;
   said exhaust chute discharge port and said return chute inlet port located at said cowling and extending into openings formed in said cowling, said return chute inlet disposed proximate the top wall of said grass catcher to inhibit the passage of solids into said return chute.

10. The apparatus of claim 9, wherein said cowling is generally vertically oriented, and said return chute protrudes through said cowling into said grass catcher at an angle, relative to said cowlings.

11. The apparatus of claim 1, wherein said grass catcher is formed from one piece, and has no internally projections which channel flow within the grass catcher.

12. The apparatus of claim 1, wherein said return chute discharge port is elongated along an axis tangential to said blade's circular rotational path and said return chute discharge port extends along an arcuate portion of said circular path, said return chute discharge port surrounded by a shroud which protrudes beneath said lawn mower deck, said shroud having a radially outer wall relative to the center of said blade to direct the flow out of said return chute towards the center of said blade.

13. The apparatus of claim 12, wherein said shroud includes a partially enclosed trailing end shield which directs flow tangentially to said circular blade path, and in the direction of said blade's rotation.

14. In a lawnmower, having a rotating blade and a deck enclosing said blade, a vacuum apparatus, comprising:
   a grass catcher having a top wall, a bottom wall, a rear wall, side wall, and an opening for receiving grass clippings from said mower;
   a first chute connected to said mower, for discharging a stream of pressureized air containing grass clippings from beneath said deck in a direction generally parallel to said bottom wall to cause said airstream to impact against said rear wall, such that said clippings are driven along said bottom wall towards said rear wall;
   a second chute, connected to said mower, for drawing air from a location adjacent said top wall of said catcher to return air from said catcher to a location beneath said deck; and
   means attached to said mower, for sealing said chutes to said grass catcher opening such that airflow discharged from said second chute to said location beneath said deck is recirculated from said location beneath said deck through said first chute and back to said grass catcher to form a circulatory airflow loop in which grass clippings preciptate into said grass catcher, said sealing means detachably mounting said catcher to said mower.

15. The vacuum apparatus of claim 14, wherein said grass catcher is formed by a material sufficiently rigid to withstand the impact of said air stream against said rear wall.

16. The apparatus of claim 14, wherein said first chute has an inlet port beneath said deck and a discharge port at the opening of said grass catcher, said inlet port located near the perimeter of the blade's circular cutting path.

17. The apparatus of claim 16, wherein said second chute has an inlet port at the opening of said grass catcher and a discharge port beneath said deck, said discharge port proximate the rotational center of the blade.

18. The apparatus of claim 14, wherein said first chute has a discharge port at the opening of said grass catcher, and said second chute has an inlet port at said grass catcher opening, second chute discharge port extending downwardly, toward the grass catcher bottom wall, further than said first chute inlet port.

* * * * *